US011762688B2

(12) United States Patent
Pokkuluri

(10) Patent No.: US 11,762,688 B2
(45) Date of Patent: Sep. 19, 2023

(54) SYSTEMS AND METHODS FOR BATCH JOB EXECUTION IN CLUSTERED ENVIRONMENTS USING EXECUTION TIMESTAMP GRANULARITY BETWEEN SERVICE INSTANCES HAVING DIFFERENT SYSTEM TIMES

(71) Applicant: Capital One Services, LLC, McLean, VA (US)

(72) Inventor: Kirankumar Pokkuluri, Newark, DE (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/449,276

(22) Filed: Sep. 29, 2021

(65) Prior Publication Data

US 2022/0019465 A1   Jan. 20, 2022

Related U.S. Application Data

(63) Continuation of application No. 16/413,379, filed on May 15, 2019, now Pat. No. 11,144,346.

(51) Int. Cl.
*G06F 9/48* (2006.01)
*G06F 9/50* (2006.01)
(Continued)

(52) U.S. Cl.
CPC .......... *G06F 9/4881* (2013.01); *G06F 9/5038* (2013.01); *G06Q 20/10* (2013.01); *G06Q 20/40* (2013.01); *G06Q 20/401* (2013.01)

(58) Field of Classification Search
CPC ..... G06F 9/4881; G06F 9/5038; G06Q 20/10; G06Q 20/40; G06Q 20/401
See application file for complete search history.

(56) References Cited

U.S. PATENT DOCUMENTS 5,349,656 A   9/1994   Kaneko et al.
8,555,281 B1  10/2013  van Dijk et al.
(Continued)

OTHER PUBLICATIONS

Lukas Krecan, "ShedLock", https://github.com/lukas-krecan/ShedLock (accessed May 14, 2019).
(Continued)

*Primary Examiner* — Michael W Ayers
(74) *Attorney, Agent, or Firm* — Bookoff McAndrews, PLLC

(57) ABSTRACT

Systems and methods are disclosed for batch job execution. In some embodiments, a method may include: executing a plurality of service instances, each service instance being configured to execute jobs stored in a database; and by a first service instance of the plurality of service instances, identifying a job stored in the database, determining that no service instance of the plurality of service instances other than the first service instance has initiated execution of the job, generating an execution timestamp having a granularity of one second or longer, recording the generated execution timestamp in the database such that the execution timestamp is associated with the job, and executing the job. The service instances other than the first service instance may be configured to avoid execution of the job upon determining that a respective system time matches the execution timestamp to the granularity of the execution timestamp.

20 Claims, 5 Drawing Sheets

(51) Int. Cl.
*G06Q 20/10* (2012.01)
*G06Q 20/40* (2012.01)

(56) References Cited

U.S. PATENT DOCUMENTS

| | | |
|---|---|---|
| 8,571,980 B1 | 10/2013 | Greenwood |
| 8,707,310 B2 | 4/2014 | Upadhyaya et al. |
| 8,949,853 B2 | 2/2015 | Zimmermann |
| 8,954,592 B1 | 2/2015 | Cormie et al. |
| 8,954,968 B1 | 2/2015 | Pohl et al. |
| 2005/0268300 A1 | 12/2005 | Lamb et al. |
| 2009/0113432 A1 | 4/2009 | Singh et al. |
| 2012/0150528 A1 | 6/2012 | Upadhyaya et al. |
| 2013/0036425 A1 | 2/2013 | Zimmermann |
| 2013/0198358 A1 | 8/2013 | Taylor |
| 2016/0132787 A1 | 5/2016 | Drevo et al. |
| 2016/0139952 A1 | 5/2016 | Geng et al. |
| 2017/0031713 A1* | 2/2017 | Campbell ............. G06F 9/4881 |
| 2018/0239651 A1 | 8/2018 | Gong et al. |
| 2018/0365283 A1 | 12/2018 | Petit et al. |
| 2020/0068010 A1 | 2/2020 | Xing et al. |
| 2020/0068038 A1 | 2/2020 | Xing et al. |
| 2021/0133179 A1* | 5/2021 | Lee ......................... G06F 16/21 |

OTHER PUBLICATIONS

Lukas Krecan, "Implementing a Scheduler Lock", DZone, Jan. 10, 2017, https://dzone.com/articles/implementing-scheduler-lock.
"Quartz Job Scheduler", http://www.quartz-scheduler.org/ (accessed May 14, 2019).
Craig Flichel, "Why You Shouldn't Use Quartz Scheduler", DZone, Jan. 30, 2012, https://dzone.com/articles/why-you-shouldnt-use-quartz.

* cited by examiner

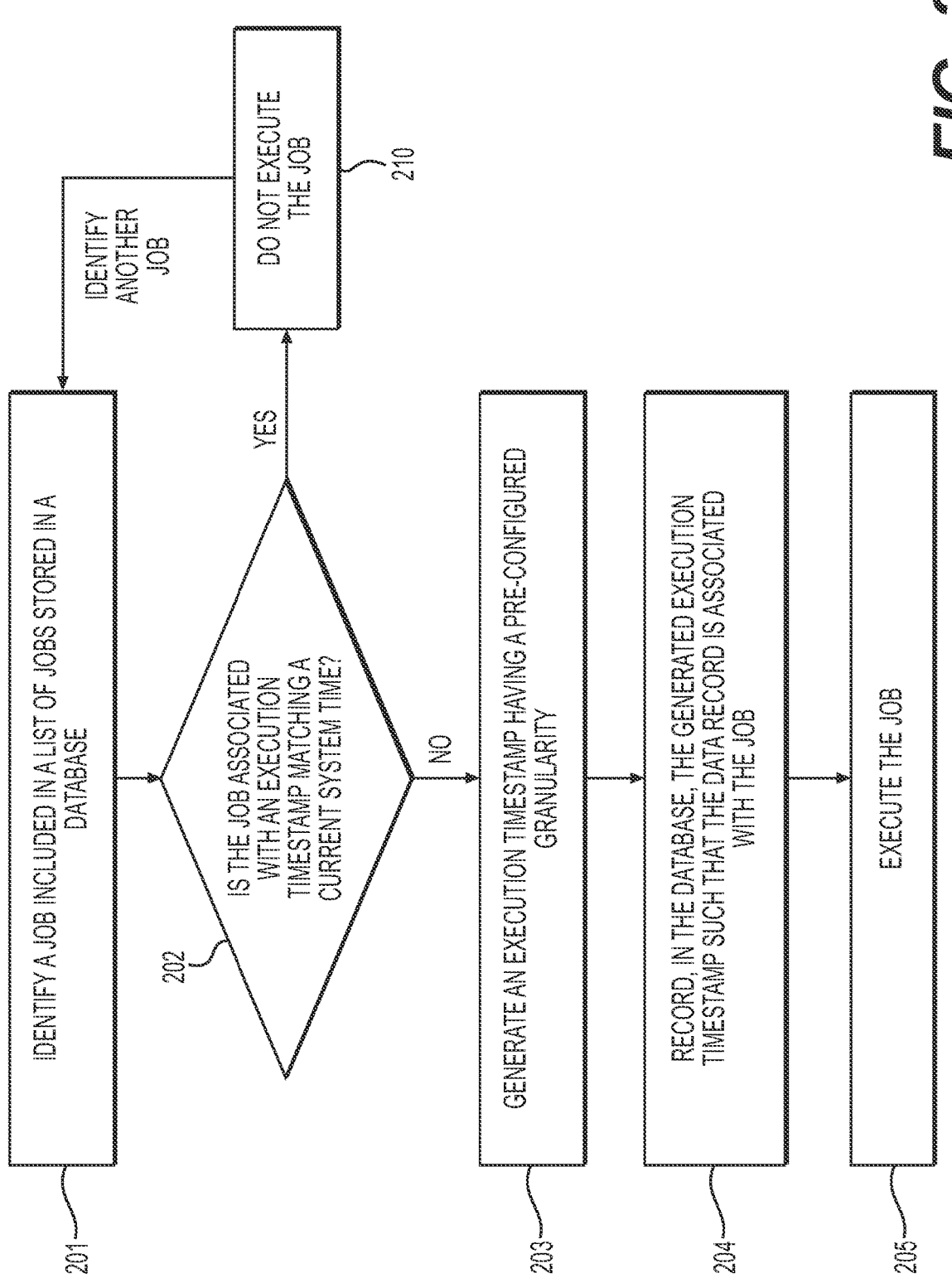

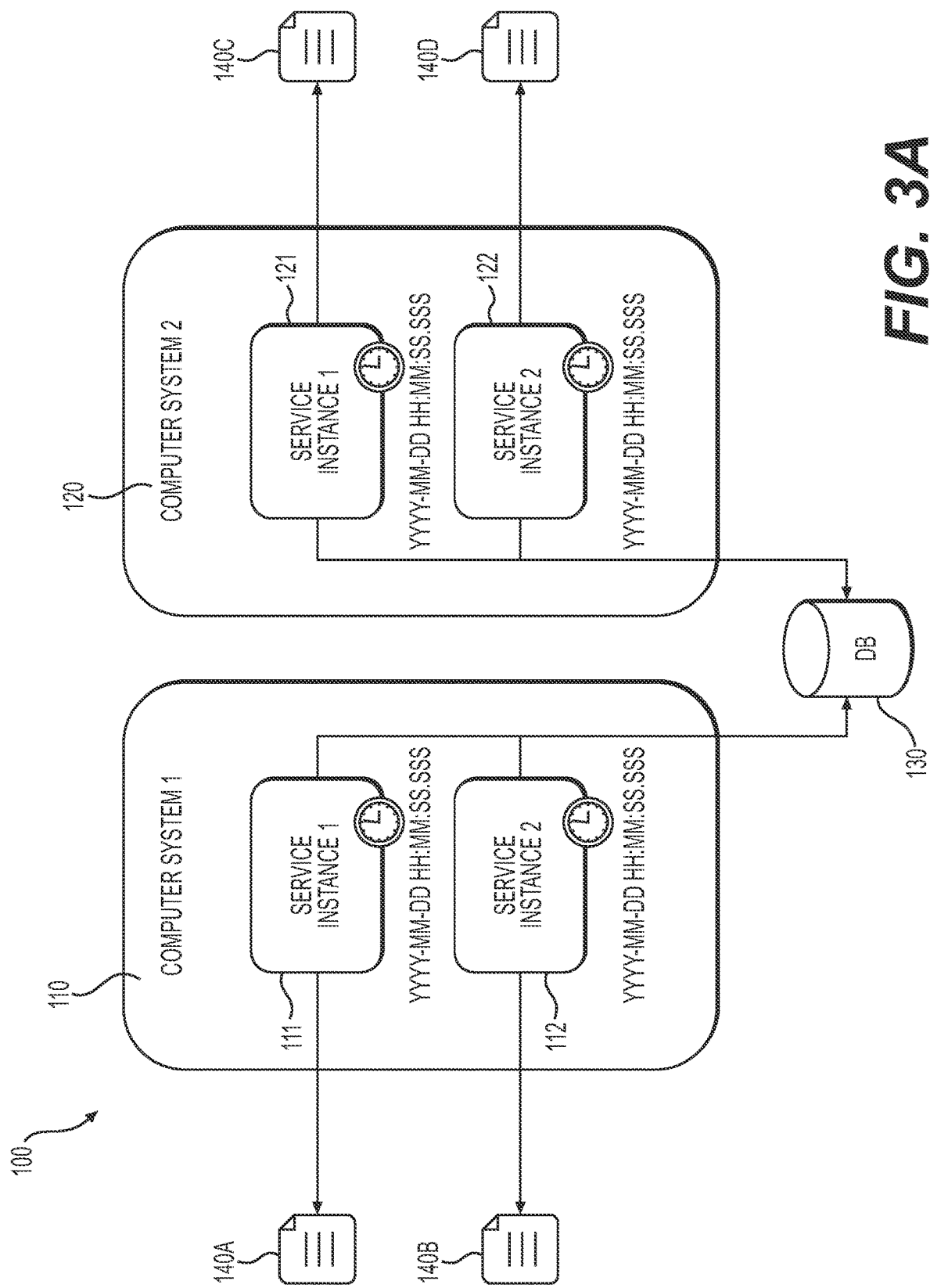

SYSTEMS AND METHODS FOR BATCH JOB EXECUTION IN CLUSTERED ENVIRONMENTS USING EXECUTION TIMESTAMP GRANULARITY BETWEEN SERVICE INSTANCES HAVING DIFFERENT SYSTEM TIMES

CROSS-REFERENCE TO RELATED APPLICATION(S)

This patent application is a continuation of and claims the benefit of priority to U.S. Non-Provisional patent Ser. No. 16/413,379, filed May 15, 2019, the entirety of which is incorporated herein by reference.

TECHNICAL FIELD

Various embodiments of the present disclosure relate generally to batch job execution in clustered environments.

BACKGROUND

In a clustered environment, multiple service instances may be used to perform tasks in a distributed manner. If multiple service instances are used to perform batch job execution, it may be the case that the same job will be executed by multiple service instances, potentially resulting in erroneous duplication of processes. As such, there is a need to avoid execution of the same job by multiple service instances.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, systems and methods are disclosed for batch job execution in clustered environments.

For instance, a method may include: executing a plurality of service instances, each service instance being configured to execute jobs stored in a database; and by a first service instance of the plurality of service instances, identifying a job stored in the database, determining that no service instance of the plurality of service instances other than the first service instance has initiated execution of the job, generating an execution timestamp having a granularity of one second or longer, recording the generated execution timestamp in the database such that the execution timestamp is associated with the job, and executing the job, wherein each of the service instances of the plurality of service instances other than the first service instance is configured to avoid execution of the job upon determining that a respective system time matches the execution timestamp to the granularity of the execution timestamp.

Furthermore, a system may include: a first computer system comprising one or more processors configured to execute a first service, wherein the first service is configured to: identify a job stored in a database; generate an execution timestamp having a granularity of one second or longer; record the generated execution timestamp in the database such that the execution timestamp is associated with the job; and execute the job; and a second computer system comprising one or more processors configured to execute a second service, wherein the second service is configured to: identify the job by querying the database; determine that the job is associated with the execution timestamp; determine whether a system time of the second service matches the execution timestamp to the granularity of the execution timestamp; and upon determining that the system time of the second service matches the execution timestamp to the granularity of the execution timestamp, refrain from executing the job.

Furthermore, a system may include: a first computer system comprising one or more processors configured to execute a first service instance, wherein the first service instance is configured to: identify a job stored in a database, the job being generation of a file representing a transaction of transferring payment to a financial institution; generate an execution timestamp having a granularity of one second or longer; record the generated execution timestamp in the database such that the execution timestamp is associated with the job; and execute the job, thereby generating the file; and a second computer system comprising one or more processors configured to execute a second service instance, wherein the second service instance is configured to: identify the job by querying the database; determine that the job is associated with the execution timestamp; determine whether a system time of the second service instance matches the execution timestamp to the granularity of the execution timestamp; and upon determining that a system time of the second service instance matches the execution timestamp to the granularity of the execution timestamp, refrain from executing the job.

According to additional aspects of the disclosure, a non-transitory computer-readable medium stores instructions that, when executed by one or more processors, cause the one or more processors to perform the aforementioned computer-implemented method or the operations that the aforementioned computer systems are configured to perform.

Additional aspects and examples will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 2 depicts a flowchart of a method for batch job execution in clustered environments, according to one or more embodiments.

FIGS. 3A and 3B depict examples of using execution timestamps as execution identifiers, according to one or more embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As will be discussed in more detail below, in an environment in which multiple service instances perform jobs stored in a commonly accessible database, duplicate execution of a job may be avoided by using an execution identifier indicating that a job is already being executed, or has been previously executed, by one of the service instances.

In various embodiments, when a service instance executes a job, that service instance may add an execution timestamp associated with the job. The execution timestamp may have a certain time granularity. When another service instance determines that a job is associated with an execution timestamp, that service instance may refrain from performing the job if its current system time matches the execution timestamp to the aforementioned granularity. For example, if the execution timestamp has a granularity of one minute so as to indicate a certain minute of time, then other service instances may refrain from executing the same job during that minute, as determined based on the respective system times of those other service instances.

Figure 1:
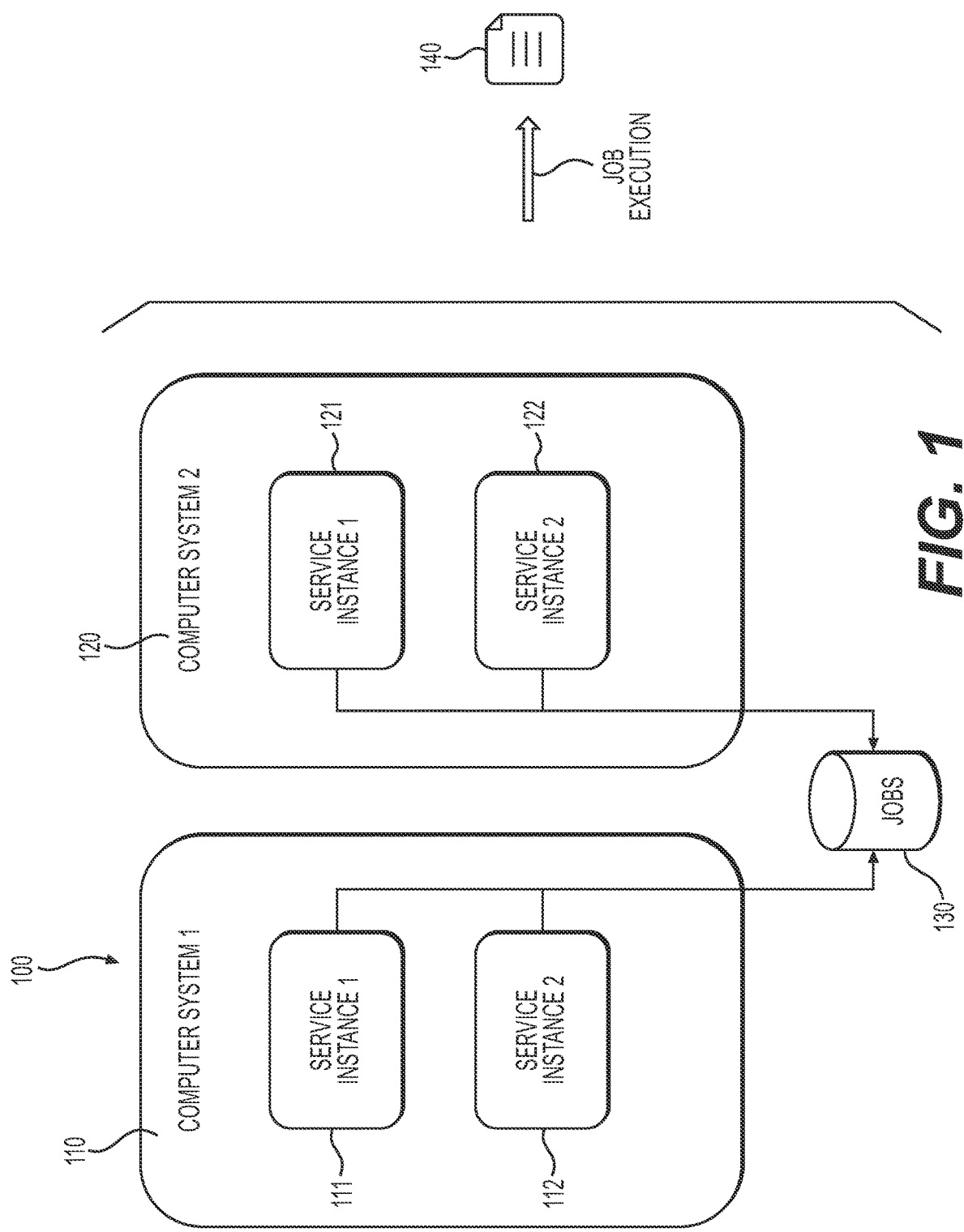
FIG. 1 depicts an exemplary system infrastructure for batch job execution in clustered environments, according to one or more embodiments.

FIG. 1 illustrates a system infrastructure 100 according to one or more embodiments. The system infrastructure 100 may include a plurality of computer systems, which may include a first computer system 110 and a second computer system 120. The plurality of computer systems, including first computer system 110 and second computer system 120, may each be configured to perform jobs stored in a database, such as database 130, in a distributed manner.

As used herein, the term "computer system" may encompass any system that includes one or more computing devices, such as a computing device described below in relation to FIG. 4. For example, while computer systems 110 and 120 are examples of computer systems, any system that includes the system infrastructure 100 may be referred to as a computer system.

Computer systems 110 and 120 may have any suitable form or configuration, and may be, for example, a distributed computing system, a cluster computing system, a grid computing system, a cloud computing system, or any combination thereof. In some embodiments, computer systems 110 and 120 may be different respective cloud computing regions of a cloud service provider, or components of such cloud computing regions. Examples of cloud service providers include Amazon Web Service (AWS), Microsoft Azure, and Google Cloud.

For example, first computer system 110 may be the Oregon US West region of AWS (or a component of this region), and second computer system 120 may be the Northern Virginia US East region of AWS (or a component of this region). A component of a cloud computing region may include any portion of the cloud infrastructure operating the cloud computing region. While examples for cloud computing implementations are provided in this disclosure for purposes of illustration, it is understood that computer systems 110 and 120 are not limited to cloud computing implementations. For example, the methodologies described in the present disclosure are also applicable to implementations in which computer systems 110 and 120 are personal computers or dedicated servers.

In some embodiments, computer systems 110 and 120 may operate in a redundancy scheme. For example, computer systems 110 and 120 may both be configured to be capable of independently performing a certain set of functionalities, such as batch processing of jobs stored in database 130. Accordingly, if one computer system becomes inoperable due to system failure, power loss, or other reasons, the functionalities may still be provided by the other computer system without downtime. That is, each computer system may serve as a back-up for another computer system. When both computer systems 110 and 120 are operational, workload for the functionalities may be distributed among the two computer systems 110 and 120.

System infrastructure 100 may include a plurality of service instances for executing batch jobs stored in database 130. Such service instances may include one or more service instances run by first computer system 110 (e.g., service instances 111 and 112) and one or more instances run by second computer system 120 (e.g., service instances 121 and 122). Two or more of such service instances may operate concurrently with one another. While FIG. 1 depicts two service instances for each of computer systems 110 and 120, the disclosure is not so limited. For example, each of computer systems 110 and 120 may have more or less service instances, and in some arrangements, one of computer systems 110 and 120 may have a different quantity of service instances than the other of computer systems 110 and 120 without departing from the scope of the present disclosure. For example, in cloud computing implementations for computer systems 110 and 120, the number of service instances may be scalable based on, for example, the current load for processing jobs stored in database 130.

As shown in FIG. 1, the aforementioned service instances may operate in a clustered environment provided by system infrastructure 100. A clustered environment may include one or more clusters, each cluster including a plurality of service instances. For example, service instances 111 and 112 may be part of a first cluster operated by first computer system 110, while service instances 121 and 122 may be part of a second cluster operated by second computer system 120. As used herein, the term "clustered environment" is interchangeable with "cluster environment."

Database 130 may store information pertaining to jobs to be performed by any one of the service instances 111, 112, 121, and 122. Database 130 may include a list of jobs (e.g., a job queue), which may be stored in any suitable format, such as a table. The list of jobs may include one or more jobs that may be performed by any one of the service instances 111, 112, 121, and 122.

Database 130 be hosted on any suitable computer system, such as first computer system 110, second computer system 120, or some other computer system that is connected to (e.g., in communication with) computer systems 110 and 120. Database 130 may be connected to computer systems 110 and/or 120 through one or more communications networks, if hosted remotely therefrom.

As used herein, a "job" may specify one or more operations to be performed by a service instance. Such an operation may include, for example, the execution of a process resulting in the generation of file 140, as illustrated in FIG. 1. It is understood, however, that the present disclosure is not so limited, and that the one or more operations to be performed may include any operation, such as creating, reading, updating, and/or deleting data, wherein such data may be retrieved from or stored in any suitable location. An operation may be specified by a job as part of a task or a step. A job may be stored in database 130 in any suitable form, such as a database entry. Batch processing of jobs may involve any suitable framework, such as Spring Batch, that is implemented in conjunction with the methodologies described in this disclosure.

System infrastructure 100 may be applied in a variety of contexts, without limitation as to a particular industry or field of use. As an illustrative example of financial services applications, the system infrastructure 100 may be deployed to perform batch processing of jobs pertaining to transfer of financial assets between parties. Such jobs may entail the execution of processes for the generation of a file 140 representing a financial transaction. For example, system infrastructure 100 may run jobs that result in the crediting of funds to a party. When used in such an application, it would be desirable not to have the job run multiple times for the same input. Otherwise, the party may be credited with the funds multiple times, resulting in loss to another party crediting the funds to the party.

In more detail, an organization using system infrastructure 100 may be a bank that is to perform a transaction in the role of an originating depository financial institution. To complete the transaction, one of the service instance 111, 112, 121, 122 may run a process of generating file 140 as an automated clearing house (ACH) file representing a person-to-person (P2P) transaction of transferring funds from an account maintained by the bank to an account maintained by a receiving bank. The generated ACH file may be transmitted, from computer system 110 or 120 (whichever one is operating the service instance that generated the ACH file), to an ACH operator over one or more communications networks. The ACH operator may then route the ACH file to the receiving bank, which may process the transaction. In such a scenario, it is desirable that only one of the service instances 111, 112, 121, 122 generate the ACH file. Otherwise, if multiple service instances all generate the same ACH file, the duplication of the ACH file may result in duplication of payments to the receiving bank, resulting in loss for the bank acting as the originating depository financial institution.

As noted above, collision between service instances 111, 112, 121, and 122 in the form of duplicated execution of the same job may occur if two or more of the service instances 111, 112, 121, and 122 each executes the same job. To avoid such collisions, each service instance may, before executing a job, determine whether the job is already being executed by another service instance. In order to perform this determination, the service instance may determine whether the job stored in database 130 is associated with an execution identifier indicating that the job is already being performed by another service instance.

The execution identifier may be any suitable execution identifier capable of indicating that the job is already being performed by another service instance. For example, the execution identifier may be an execution timestamp indicating the time at which execution of the job has begun. In various embodiments, the execution timestamp, serving as an executing identifier, may have a predetermined granularity permitting the associated job to be determined as being executed by a service instance. Depending on the implementation, the granularity may be, for example, 1 second or longer. Such a granularity may be a seconds-level granularity, a minutes-level granularity, or a granularity of a longer length of time.

A seconds-level granularity may be a granularity of one or more seconds (e.g., 1 second, 2 seconds, 3 seconds, 5 seconds, 10 seconds, 15 seconds, 20 seconds, 30 seconds, 59 seconds etc.). Therefore, a timestamp having a seconds-level granularity may, for example, specify a time in units of whole seconds, without specifying a value for any finer units of time, such as milliseconds.

A minutes-level granularity may be a granularity of one or more minutes (e.g., 1 minute, 2 minutes, 3 minutes, 5 minutes, 10 minutes, 15 minutes, 20 minutes, 30 minutes, 59 minutes etc.). Therefore, a timestamp having a minutes-level granularity may, for example, specify a time in units of whole minutes, without specifying a value for any finer units of time, such as seconds.

The execution identifier may be associated with the job in any suitable manner permitting the execution identifier to be identified together with, or based on, the job. For example, the execution identifier may be stored in a datable table row or other data field associated with the job. For example, if Spring Batch is used as a framework for batch job processing, an additional data field for the execution identifier may be used along with data fields that are used by Spring Batch to store the jobs.

FIG. 2 illustrates a method for performing batch job execution in a clustered environment using the aforementioned execution timestamp as an execution identifier, according to one or more embodiments. The method may be performed by any of the service instances 111, 112, 121, and 122, in which case the method may be said to be performed by the computer system 110 or 120 that includes the service instance performing the method.

Step 201 may include identifying a job included in a list of jobs stored in a database. In step 201, the database may be database 130, as described above. The list of jobs may be a job queue, for example. The job may specify the execution of any suitable process. To identify the job, the service instance performing step 201 may query the database (e.g., database 130) and retrieve data from the database describing the job. Such data may, for example, include the data records of one or more columns of a database row corresponding to the job.

Step 202 may include determining whether the identified job is associated with an execution timestamp matching the current system time. A timestamp associated with a job may exist if, for example, another service instance has begun execution of the job, and has generated and recorded the timestamp, such as in the manner of steps 203 and 204, described below.

Step 202 may result in a determination of "NO" upon determination that the job is not associated with an execution timestamp. For example, if no service instance has executed the job, then it is possible for there to be no execution timestamp associated with the job. However, a result of "NO" may also occur upon determination that an existing execution timestamp associated with the job does not match the system time.

As described above, an execution timestamp may have a certain granularity. Accordingly, in step 202, the execution timestamp associated with the identified job, if such timestamp exists, may be determined to match the system time if the execution timestamp matches the system time in the same granularity. For example, if the execution timestamp has a granularity of minutes, then the system time may be determined to match the execution timestamp if there is match on the minutes level. For example, a timestamp indicating 12:01 (12 hours, 1 minute) and having a granularity of 1 minute may be deemed to match a system time of 12:01:45 (12 hours, 1 minutes, 45 seconds), regardless of the seconds value. However, a system time of 12:02:02 (12 hours, 2 minutes, 2 seconds) may be determined as not matching the timestamp indicating 12:01 (12 hours, 1 minute).

If step 202 resolves to "YES," then the service instance performing the method does not execute the job (step 210). The service instance may proceed to query the database to identify another job stored in the database. A result of "YES" may occur if an execution timestamp already exists for the job, and step 202 is performed such that the current system time is within the same timeframe corresponding to the granularity of the execution timestamp. For example, continuing with the above example in which the execution timestamp has a granularity of 1 minute, if the execution timestamp exists for the identified job and indicating "12:01" (for a certain day of a certain year), then the service instance performing the method will not execute the job during the system times of 12:01:00 through 12:01:59. As another example, if the execution timestamp indicates "12:02" (12 hours, 2 minutes) and has a granularity of 2 minutes, then the service instance performing the method will not execute the job during the system times of 12:02:00 through 12:03:59.

If step 202 resolves to "NO," the service instance performing the method may determine that it is permitted to execute the job. Accordingly, the service instance may proceed to steps 203 to 205.

The current system time may be, for example, a current time as recognized by a system clock process of the computer system running the service instance performing step 202. In some embodiments, the current system time may be accessible by a timestamp function accessible by the service instance performing step 202.

Step 203 may include generating an execution timestamp having a preconfigured granularity. The execution timestamp may be a timestamp representing the time at which execution of the job began. The granularity may be any suitable granularity, such as a seconds-level granularity or a minutes-level granularity, as described above. The execution timestamp may have a time value of the system time of the service instance performing step 202 when step 202 is performed. If the system time has a granularity that is shorter than the preconfigured granularity of the execution timestamp, then the time value of the current system time may be truncated, rounded, or otherwise processed to have the preconfigured granularity. The granularity may be preconfigured by any suitable method, such as a user-configurable setting that is stored in the computer system performing step 203.

Step 204 may include recording, in the database, the generated execution timestamp such that the data record is associated with the job. For example, the service instance performing step 204 may query the database to add the execution timestamp to a data field in the database that is associated with the job. For example, the execution timestamp may be added to a table row associated with the job.

Once the execution timestamp is recorded in step 204, other service instances that identify the same job would also identify the execution timestamp for purposes of step 202. As noted above, step 202 may be based on a match to a certain granularity of time. Therefore, if the execution timestamp has a granularity of one minute, for example, then recordation of the execution timestamp may preclude other service instances from executing the same job within that minute.

Step 205 may include executing the job. As noted above, execution of the job may include execution of one or more operations specified by the job. In some embodiments, the execution of the job may result in the generation of a file, such as file 140 shown in FIG. 1.

Steps 204 to 205 may be performed in sequential order as shown in FIG. 2. Therefore, the execution timestamp may indicate a time immediately prior to execution of the job in step 205. However, it is also possible for steps 204 and 205 to be performed concurrently.

As a possible additional step after step 205, the service instance performing the method may remove the job from the database when the job has been completed. For example, the service instance may query database 130 to remove the entry corresponding to the job that was executed in step 205.

By configuring a plurality of service instances to perform the method shown in FIG. 2, when a first service instance of the plurality of service instances executes a job, then each of the service instances of the plurality of service instances other than the first service instance would avoid execution of the job upon determining that a respective system time matches the execution timestamp to the granularity of the execution timestamp.

Figure 3B:
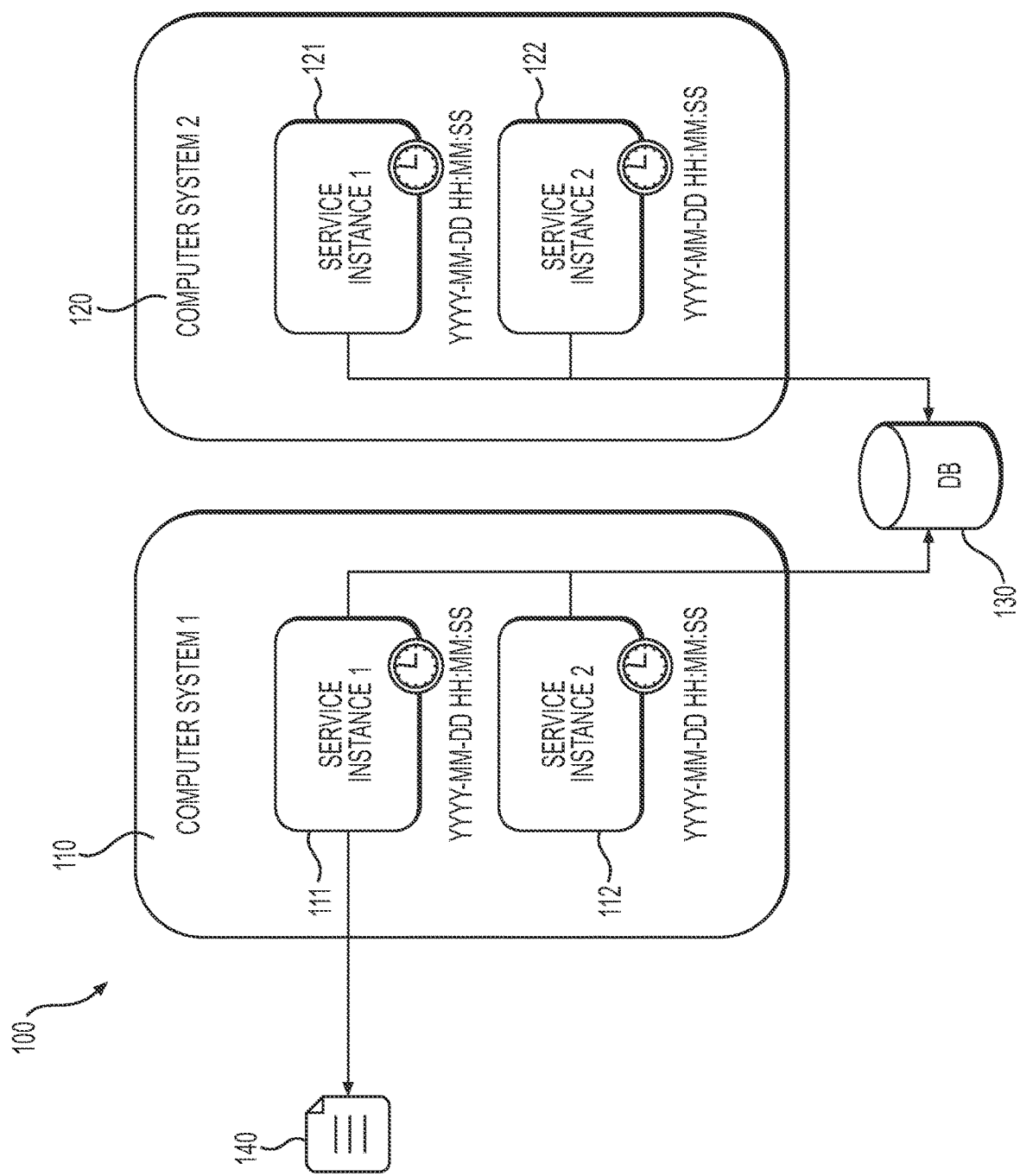

FIGS. 3A and 3B illustrate batch job execution in a clustered environment using execution timestamps of different respective granularity. In FIG. 3A, the execution timestamp has a granularity of 1 millisecond, while in FIG. 3B, the execution timestamp has a granularity of 1 second.

In FIG. 3A, each of the service instances 111, 112, 121, and 122 may perform the method of FIG. 2, described above, wherein the execution timestamp generated in step 203 and recorded in step 204 has a granularity of 1 millisecond, as opposed to a seconds-level or minutes-level granularity, discussed above. In FIG. 3A, the execution timestamps generated by the service instances 111, 112, 121, and 122 are represented by the expression "YYYY-MM-DD HH:MM:SS.SSS" (e.g., "2019-01-21 11:07:56:145" for Jan. 21, 2019, 11 hours, 7 minutes, 56 seconds, 145 milliseconds), wherein the element "SSS" represent milliseconds. It is noted that the timestamp expression in FIG. 3A is for illustration only. The execution timestamp may be generated and stored in the database 130 in any suitable format, such as formats that represent time as an integer.

If service instances 111, 112, 121, and 122 perform the method of FIG. 2 on the same job, step 202 may nonetheless resolve to "NO" for each of the service instances 111, 112, 121, and 122 if the service instances 111, 112, 121, and 122 differ in timing by milliseconds. For example, if service instance 111 is the first service instance to perform step 203 for a certain job, service instance 111 may record its execution timestamp in step 204. A few milliseconds later, service instance 112, for example, may identify the same job, and compare the execution timestamp generated by service instance 111 with the current system time of service instance 112 in accordance with step 202. Since the execution timestamp differs from the current system time of service instance 112 by a few milliseconds, step 202 may resolve to "NO."

As shown in FIG. 3A, if the timings of service instances 111, 112, 121, and 122 are separated by milliseconds, then the same job may execute four times, resulting in the generation of files 140A, 140B, 140C, and 140D, each being a duplicate of one another. As described above, in applications in which the file generated by the service instance represents a financial transaction, the transaction may be processed four times, potentially resulting in loss to a party involved in the transaction.

On the other hand, in FIG. 3B, the service instances 111, 112, 121, and 122 perform the method of FIG. 2 such that the execution timestamp generated in step 203 and recorded in step 204 has a granularity of 1 second, as represented by the expression "YYYY-MM-DD HH:MM:SS." Accordingly, even if the service instances 111, 112, 121, and 122 identify the same job at different times, or have system times that differ by few milliseconds, only one instance of file 140 is generated. In this case, if service instance 111 is the first service instance to identify the job resulting in generation of file 140, then the timestamp created by the service instance 111, being in the seconds-level, would match the current system time of other service instances to the same second, thereby precluding the other service instances from executing the job.

As discussed above, methods of the present disclosure may an execution identifier as a current timestamp up to a certain level of granularity, such as a seconds or minutes-level granularity. By doing so, the system operating multiple service instances would determine that there was already an execution and stop any other possible execution that may trigger at the corresponding timeframe (e.g., the second or the minute of the execution timestamp) even when there is a slight difference (e.g., a millisecond difference) between the executions.

For example, in a clustered environment in which a batch process is distributed among different service instances of different respective regions of a cloud service provider, the methods of the present disclosure may be implemented such that a particular job may be triggered in only one region and only one service instance. Therefore, the methods of the present disclosure provide a solution for the problem of multiple triggering of same batch job, which may have an undesirable result in applications such as banking.

Therefore, the methods of the present disclosure may improve the functionalities of computers in performing batch processes in clustered environments, thereby improving such computer technology.

In general, any process discussed in this disclosure that is understood to be computer-implementable, such as the process shown in FIG. 2 and the processes described in connection with FIGS. 3A-3B, may be performed by one or more processors of a computer system, such as first computer system 110 and/or second computer system 120, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or another type of processing unit.

A computer system, such as computer system 110 or 120, may include one or more computing devices. If the one or more processors of the computer system is implemented as a plurality of processors, the plurality of processors may be included in a single computing device or distributed among a plurality of computing devices. If a computer system comprises a plurality of computing devices, the memory of the computer system may include the respective memory of each computing device of the plurality of computing devices.

Figure 4:
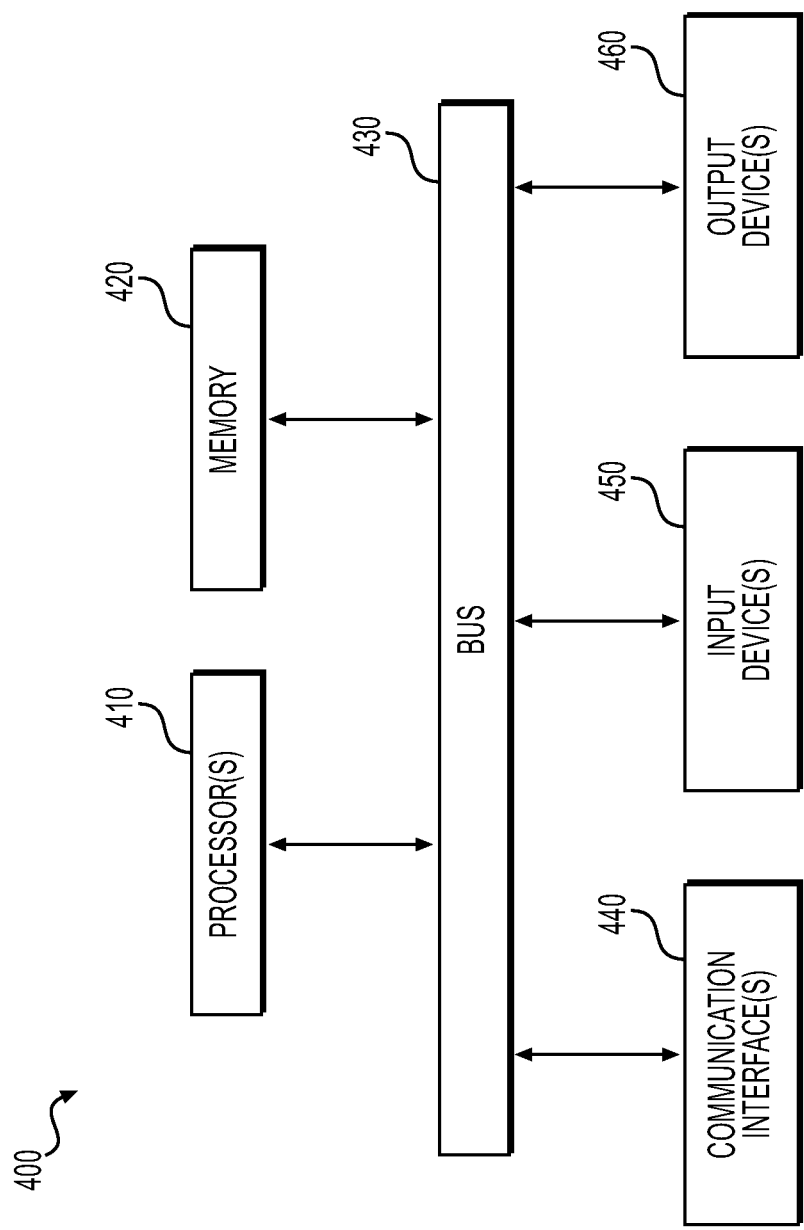
FIG. 4 depicts an exemplary computing device, according to one or more embodiments.

FIG. 4 illustrates an example of a computing device 400 of a computer system. The computing device 400 may include processor(s) 410 (e.g., CPU, GPU, or other processing unit), a memory 420, and communication interface(s) 440 (e.g., a network interface) to communicate with other devices. Memory 420 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 420. The computing device 400 may, in some embodiments, further include input device(s) 450 (e.g., a keyboard, mouse, or touchscreen) and output device(s) 460 (e.g., a display, printer). The aforementioned elements of the computing device 400 may be connected to one another through a bus 430, which represents one or more busses. In some embodiments, the processor(s) 410 of the computing device 400 includes both a CPU and a GPU.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, configure and/or cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A computer-implemented method for batch job execution, the method comprising:
    executing a plurality of service instances, each service instance being configured to execute jobs stored in a database;
    identifying a job stored in the database;
    identifying a first service instance having a first system time of a system clock processing the first service instance;
    identifying a second service instance having a second system time of a system clock processing the second service instance;
    determining that no service instance of the plurality of service instances other than the first service instance has initiated execution of the job;
    generating an execution timestamp having a granularity of at least one of 2 seconds, 3 seconds, or 5 seconds, wherein the granularity is associated with the job being executed by the first service instance while preventing the second service instance from performing the job for a length of the granularity;
    recording the generated execution timestamp in the database such that the execution timestamp is associated with the job;
    instructing the first service instance to execute the job;
    determining whether the second system time matches the first execution timestamp to the granularity of the execution timestamp associated with the job; and
    upon determining that the second system time matches the first execution timestamp to the granularity of the first execution timestamp, instructing the second service instance to refrain from executing the job for the length of the granularity of the first execution timestamp.

2. The method of claim 1, wherein the first execution timestamp has a time value of a system time of the first service instance prior to the executing the first job.

3. The method of claim 1, wherein the job includes generation of a file representing a financial transaction.

4. The method of claim 3, wherein the financial transaction comprises an automated clearing house file representing a person-to-person transaction of transferring funds from an account maintained by a bank to an account maintained by a receiving bank.

5. The method of claim 1, further comprising:
    upon determining that the system time of the second service instance does not match the first execution timestamp to the granularity of the first execution timestamp, instructing the second service instance to execute the job.

6. The method of claim 1, wherein the first service instance is executed on a first computer system and the second service instance is executed on a second computer system located at a geographical region that is different from a geographic location of the first computer system.

7. The method of claim 1, wherein the jobs stored in the database are stored in a single queue of the database.

8. The method of claim 7 further comprising, by the second service instance:
    upon determining that the system time of the second service instance matches the first execution timestamp to the granularity of the first execution timestamp, querying the single queue to identify another job to be executed.

9. The method of claim 6, wherein the first computer system and the second computer system are cloud computing systems.

10. The method of claim 1, further comprising:
    upon the first service instance executing the job, removing the job from the database.

11. A computer-implemented method for batch job execution, the method comprising:
    executing a plurality of service instances, each service instance being configured to execute jobs stored in a database;
    identifying a job stored in the database;
    identifying a first service instance having a first system time of a system clock processing the first service instance;
    identifying a second service instance having a second system time of a system clock processing the second service instance;
    determining that no service instance of the plurality of service instances other than the first service instance has initiated execution of the job;
    generating an execution timestamp having a granularity at least one of 15 seconds, 20 seconds, 30 seconds, or 59 seconds, wherein the granularity is associated with the job being executed by the first service instance while preventing the second service instance from performing the job for a length of the granularity;
    recording the generated execution timestamp in the database such that the execution timestamp is associated with the job; instructing the first service instance to execute the job;
    determining whether the second system time matches the first execution timestamp to the granularity of the execution timestamp associated with the job; and upon determining that the second system time matches the first execution timestamp to the granularity of the first execution timestamp, instructing the second service instance to refrain from executing the job for the length of the granularity of the first execution timestamp.

12. The method of claim 11, wherein the first execution timestamp has a time value of a system time of the first service instance prior to the executing the first job.

13. The method of claim 11, wherein the job includes generation of a file representing a financial transaction.

14. The method of claim 13, wherein the financial transaction comprises an automated clearing house file representing a person-to-person transaction of transferring funds from an account maintained by a bank to an account maintained by a receiving bank.

15. The method of claim 11, further comprising:
upon determining that the system time of the second service instance does not match the first execution timestamp to the granularity of the first execution timestamp, instructing the second service instance to execute the job.

16. The method of claim 11, wherein the first service instance is executed on a first computer system and the second service instance is executed on a second computer system located at a geographical region that is different from a geographic location of the first computer system.

17. The method of claim 11, wherein the jobs stored in the database are stored in a single queue of the database.

18. The method of claim 17, further comprising, by the second service instance:
upon determining that the system time of the second service instance matches the first execution timestamp to the granularity of the first execution timestamp, querying the single queue to identify another job to be executed.

19. The method of claim 11, further comprising:
upon the first service instance executing the job, removing the job from the database.

20. A system for payment transfer, the system comprising:
a first computer system comprising one or more processors configured to execute a first service instance, the first service instance having a first system time of a system clock processing the first service instance; and
a second computer system comprising one or more processors configured to execute a second service instance, the second service instance having a second system time of a system clock processing the second service instance, wherein:
the first service instance and the second service instance are each configured to:
retrieve a job from a plurality of jobs stored in a database;
determine whether the job is associated with an execution timestamp by, for the second service instance, determining whether the second system time matches the first system time of the first service instance to the granularity of the execution timestamp associated with the job, and for the first service instance, determining whether the first system time matches the second system time of the second service instance to the granularity of the execution timestamp associated with the job;
upon either of the first service instance or the second service instance determining that the job is not associated with an execution timestamp, generating an execution timestamp having a granularity of at least one of 2 seconds, 3 seconds, or 5 seconds, wherein the granularity is associated with the job being executed by the either of the first service instance or the second service instance, while preventing another of the either of the first service instance or second service instance from performing the job for a length of the granularity;
instruct the service instance not executing the job to refrain from executing the job;
recording the generated execution timestamp in the database such that the execution timestamp is associated with the job; and
executing the job.

* * * * *